Nov. 20, 1951  W. H. DOHERTY ET AL  2,575,799
HIGH-FREQUENCY POWER AND IMPEDANCE MONITOR
Filed May 27, 1948
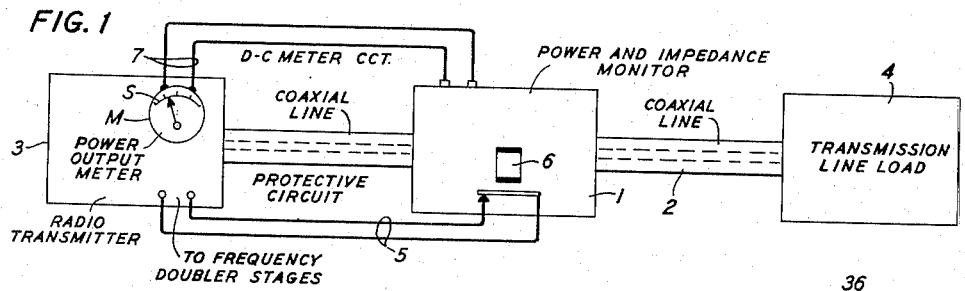
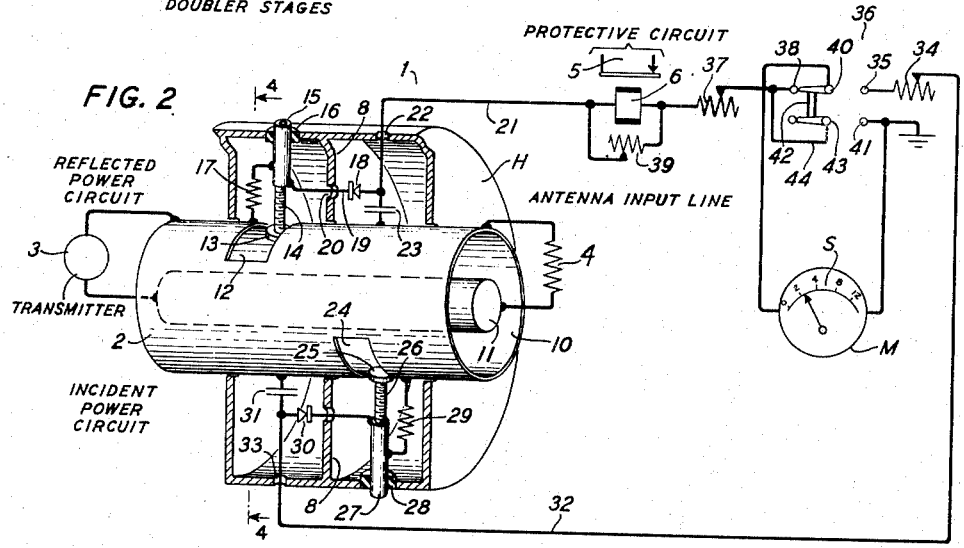
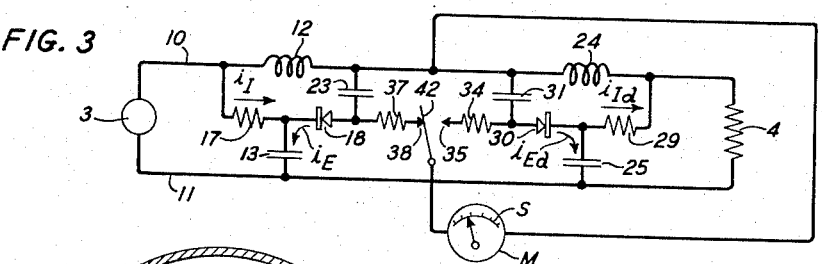
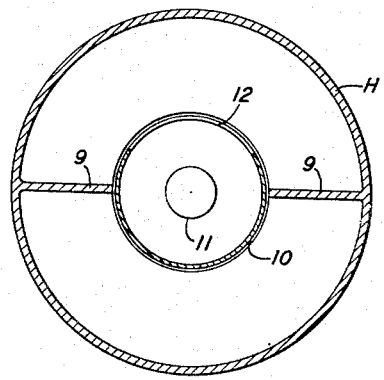
INVENTORS: W. H. DOHERTY
J. F. MORRISON
E. L. YOUNKER
BY
G. H. Stevenson
ATTORNEY Patented Nov. 20, 1951

2,575,799

UNITED STATES PATENT OFFICE 2,575,799

HIGH-FREQUENCY POWER AND IMPEDANCE MONITOR

William H. Doherty, Summit, John F. Morrison, Boonton, and Elmer L. Younker, Madison, N. J., assignors to Bell Telephone Laboratories, Incorporated, New York, N. Y., a corporation of New York Application May 27, 1948, Serial No. 29,588

8 Claims. (Cl. 171—95)

This invention relates to a monitor for measuring power and impedance in a high frequency electric transmission system and, more particularly, to a monitor for measuring both the incident power and the reflected power in a transmission line. The incident power in a transmission line may be defined as the total energy in the electric and magnetic fields associated with an electromagnetic wave traveling toward the load. The reflected power in a transmission line may be defined as the total energy in the electric and magnetic fields associated with an electromagnetic wave reflected from the load. The difference between the incident power and the reflected power is the real power absorbed by the load.

An object of the invention is the provision of improved means for measuring power in a high frequency transmission system.

Another object is to provide improved means for measuring separately the direct power and the reflected power in a high frequency transmission system.

An additional object is to provide improved means for measuring the power absorbed in a load circuit supplied with radio frequency energy.

A further object is to provide improved means for measuring impedance in a high frequency transmission system.

Still another object is to provide improved means for facilitating the adjustment of the impedance of a load circuit to match the impedance of a high frequency transmission line.

A further object is to provide improved means for controlling the operation of a protective circuit for protecting a transmitter of radio frequency energy against damage due to changes in the impedance of its associated transmission line and load circuit.

These and other objects of the invention are accomplished in a high frequency transmission system having a transmitter which delivers radio frequency energy over a coaxial transmission line to a load circuit by inserting an improved power and impedance monitor in the coaxial transmission line. The monitor comprises a shielded enclosure containing an incident power measuring circuit and a reflected power measuring circuit combined in a back-to-back manner. A control switch is provided for separately supplying the output of each measuring circuit to a meter having a scale calibrated in kilowatts so that the power indication of each circuit can be read directly in kilowatts without reference to a conversion table or chart. Each measuring circuit comprises a bridged-T network having a resistor in one series arm, a rectifier and the meter in the other series arm, and a capacitance in the shunt arm, both of the series arms being bridged by an inductance. This inductance is constituted by a slot in the outer conductor of the coaxial line. The capacitance is formed by a capacitor disk inserted into the coaxial line through the inductive slot and mounted in proximity to the inner conductor of the coaxial line. The incident power measuring circuit is responsive only to energy traveling from the transmitter to the load and the reflected power measuring circuit is responsive only to energy reflected back over the line to the transmitter. This directional feature of the measuring circuits is obtained by connecting the resistor in the incident power measuring circuit to the load side of its associated inductive slot and by connecting the resistor in the reflected power measuring circuit to the transmitter side of its associated inductive slot. An overload relay having its winding connected into the output of the reflected power measuring circuit is provided for controlling the operation of a protective circuit for protecting the transmitter against the harmful effects of large changes in the impedance of the transmission line and the associated load circuit.

These and other features of the invention are more fully described in connection with the following detailed description of the drawing in which:

Fig. 1 is a schematic diagram of a high frequency transmission system having the power and impedance monitor inserted therein;

Fig. 2 is a perspective view of the power and impedance monitor and illustrates the manner in which the monitor is inserted in the coaxial transmission line;

Fig. 3 is a circuit diagram of the high frequency transmission system with the monitor inserted therein; and Fig. 4 is a sectional view taken along the line 4—4 in Fig. 2 to show the horizontal partition inside the shielded enclosure of the monitor.

In Fig. 1, the power and impedance monitor 1 is represented as being inserted in the coaxial transmission line 2 which delivers the output energy generated by a radio transmitter 3 to its associated load circuit 4, such as the input circuit of an antenna. An overload protective circuit 5 is shown to extend from an overload relay 6, associated with the monitor 1, to the transmitter 3 for controlling its frequency doubler stages as will be described in detail hereinafter.

A meter circuit 7 extends from the output terminals of the monitor 1 to a meter M associated with the transmitter 3. The meter M is provided with a scale S which is calibrated in kilowatts so that the radio frequency power output may be read directly in kilowatts without reference to a conversion table or chart.

In Fig. 2, it can be seen that the power and impedance monitor 1 is housed in a shielded enclosure or housing H surrounding a portion of the coaxial line 2 which connects the output of the transmitter 3 to the load 4. The monitor 1 includes two somewhat similar circuits combined in a back-to-back manner. The circuit located in the lower part of the housing H is responsive only to energy traveling from the transmitter 3 toward the load 4 (incident power), while the circuit in the upper part is responsive only to energy reflected from the load 4 (reflected power). The elements of these two circuits are disposed on opposite sides of the coaxial line 2 and are further separated by a vertical shielding partition 8 and a horizontal shielding partition 9 (shown in Fig. 4) which divide the housing H into four sections or compartments.

The upper left compartment of the housing H surrounds a tranverse slot 12 which is cut in the outer conductor 10 of the coaxial line 2 and which constitutes an inductive reactance in series with the coaxial transmission line 2. This compartment also includes a capacitor plate or disk 13 which is inserted into the coaxial line 2 through the slot 12 for forming a capacitive reactance to the inner conductor 11 of the coaxial line 2. An adjusting screw 14 is provided for holding the capacitor plate 13 in proximity to the inner concentric conductor 11. The upper portion of the adjusting screw 14 is enclosed in a sleeve 15 formed of any suitable electrically conductive material. The top of the sleeve 15 projects through the housing H and is insulated therefrom by a bushing 16 of insulating material. By inserting a screw-driver into the sleeve 15, the screw 14 can be adjusted to vary the degree of proximity of the capacitor plate 13 to the inner coaxial conductor 11 thereby varying the value of their capacitance. A resistor 17 has one end connected to the electrically conductive sleeve 15 and has its other end connected to the outer coaxial conductor 10. The value of the resistor 17 is selected to be large compared with the reactance of the inductive slot 12. It is to be particularly noted that the resistor 17 is connected to the transmitter side of the inductive slot 12.

The upper right compartment of the housing H contains a crystal rectifier 18 which has one side connected to the sleeve 15 by a conductor 19 extending through a hole 20 in the partition 8. The other side of the rcetifier 18 is coupled by a by-pass condenser 23 to the outer concentric conductor 10 and is also connected to a conductor 21 which extends through a hole 22 in the housing H. This rectifier 18 has a forward resistance which is small compared to the capacitive reactance of the condenser constituted by the capacitor plate 13 and the inner coaxial conductor 11.

The incident power measuring circuit is enclosed within the two lower compartments of the housing H and its circuit elements are similar to those in the reflected power measuring circuit. They include within the lower right compartment an inductance constituted by a transverse slot 24 in the outer conductor 10, a capacitance formed by a capacitor plate 25 inserted into the coaxial line 2 through the inductive slot 24 and held in proximity to the inner conductor 11 by an adjusting screw 26, a sleeve 27 of electrically conductive material surrounding a portion of the screw 26 and having one end mounted in an insulating bushing 28 inserted in the outer conductor 10, and a resistor 29 connected between the sleeve 27 and the outer conductor 10. The lower left compartment contains a crystal detector 30 similar to the detector 18 and having one side connected to the sleeve 27 while its other side is coupled by a by-pass condenser 31 to the outer conductor 10 and is also connected to a conductor 32 which extends through a hole 33 in the housing H.

It is to be noted that, whereas the resistor 17 in the reflected power measuring circuit is connected to the transmitter side of its associated inductive slot 12, the resistor 29 in the incident power measuring circuit is connected to the load side of its associated inductance slot 24. This difference in construction accounts for the fact that one measuring circuit is responsive only to energy traveling toward the load, while the other measuring circuit is responsive only to energy reflected from the load and traveling toward the transmitter.

The conductor 32 delivers the rectified output of the incident power measuring circuit through a variable resistance 34 to a terminal 35 of a control switch 36. The conductor 21 delivers the rectified output of the reflected power measuring circuit through the winding of the overload relay 6 and a variable resistance 37 to a contact 38 of the switch 36. The armature and contact of the overload relay 6 are connected in series in the overload protective circuit 5 for controlling its operation. A rheostat 39 is connected across the winding of the relay 6 and is so adjusted as to prevent the relay 6 from operating its armature until the magnitude of the current carried by the conductor 21 exceeds a predetermined value. A direct current milliammeter M has one of its terminals connected to the upper middle terminal 40 of the switch 36 and has its other terminal connected to the grounded terminal 41 of the switch 36.

When the handle 42 of the switch 36 is thrown to the left, as is shown in Fig. 2, the switch contacts 38 and 40 are connected together to complete the circuit for delivering the rectified output of the reflected power measuring circuit to the meter M. When the handle 42 is thrown to the right, the switch contacts 35 and 40 are connected to complete the circuit for delivering the rectified output of the incident power measuring circuit to the meter M. As was stated above, the scale S of the meter M is calibrated in kilowatts so that the radio frequency power indication of the measuring circuits may be read directly in kilowatts without reference to a conversion table or chart. It is to be noted that the switch contact 38 is connected to the lower middle terminal 43 of the switch 36 by a conductor 44 so that, when the switch handle 42 is thrown to the right, the terminal 43 will be connected to the grounded terminal 41 to maintain a closed circuit through the winding of the overload relay 6 while the direct power is being measured. This insures that the overload protective circuit 5 will be in an operative condition whether the handle 42 of the switch 36 is thrown to the left or to the right.

In Fig. 3, which is a circuit schematic of the power and impedance monitor having the overload relay 6 and its associated protective circuit 5 omitted for the sake of simplicity, it can be seen that the monitor 1 comprises two bridged-T networks connected in a back-to-back manner in the high frequency transmission system. One of the series arms of the bridged-T network constituting the reflected power measuring circuit contains the resistor 17 and the other series arm includes the rectifier 18 and the indicating device M. The shunt arm contains the capacitive impedance formed by the capacitor plate 13 and the inner coaxial conductor 11. Both of the series arms are bridged by an inductive impedance constituted by the transverse slot 12 in the outer coaxial conductor 10. The bridged-T network constituting the direct power measuring circuit is similar in that one of its series arms includes the resistor 29 and its other series arm includes the rectifier 30 and, when the switch handle 42 is thrown to the right, also includes the galvanometer M. Both of these series arms are bridged by the inductance constituted by the slot 24 in the outer coaxial conductor 10. The shunt arm contains the capacitance formed by the inner coaxial conductor 11 and the capacitor plate 25. It is to be noted, as was stated above, that the resistor 17 in the reflected power measuring circuit is connected to the transmitter side of its associated inductive slot 12, while the resistor 29 in the incident power measuring circuit is connected to the load side of its associated inductive slot 24. In both networks, the impedances presented by the inductances 12 and 24 and the detectors 18 and 30 should be low in comparison with the impedances of the other branches of the networks.

Since the value (R) of the resistor 17 is large compared with the reactance (L) of the inductance 12, the voltage drop produced across the inductance 12 by the line current will cause a small sample current ($i_I$) to flow through the resistor 17 and this sample current ($i_I$) will be proportional to and in phase quadrature with the line current (I). Since the reactance (C) of the capacitance 13 is large compared with the impedance of the rectifier 18, a second sample current ($i_E$) will flow through the capacitance 13 and this sample current ($i_E$) will be proportional to and in phase quadrature with the line voltage. When the transmission line is terminated in a load impedance ($R_1$) equal to its characteristic impedance, the two sample currents will flow through the rectifier 18 in opposite phase as is indicated by the arrows in Fig. 3. The approximate values of these sample currents can be expressed as follows:

$$i_I = \frac{jwLI}{R}$$

$$i_E = jwCV$$

As these two sample currents oppose each other in the detector branch, their resultant flows through the rectifier 18 and the direct current thus produced is applied to the galvanometer M to produce a meter indication. With the transmission line still terminated in a load resistance equal to its characteristic impedance, the value of the capacitance 13 is adjusted by manipulating the screw 14 as was described above until the sample currents are equal in amplitude, this condition being indicated by zero current through the meter M. When the two sample currents are thus made equal:

$$\frac{jwLI}{R} = jwCV$$

which when simplified becomes:

$$jwLI = jwCVR$$

or $$LI = CVR$$

Since $$I = \frac{V}{R_1}$$

then by substitution it follows that:

$$\frac{LV}{R_1} = CVR$$

or $$L = CRR_1$$

which becomes $$\frac{L}{C} = RR_1$$

From this expression, it can be seen that the circuit balance is independent of the frequency of the input energy because a change in frequency causes the reactance of the inductance 12 and the capacitance 13 to change in such a manner that their product remains constant. The expression also indicates that the reflected power measuring circuit is responsive to changes in the transmission line load impedance ($R_1$). If the load impedance ($R_1$) changes, the coaxial transmission line becomes mismatched from an impedance standpoint and the balance condition is destroyed. This results in an inequality and a phase displacement of the two sample currents. Their resultant, which now is no longer zero, will flow through the rectifier 18 to produce a meter indication which is related to the magnitude of the impedance change. Since a mismatching load can be considered as reflecting a portion of the energy incident upon it, the meter indication may be considered as being caused by energy reflected back over the line to the transmitter.

As the current supplied by the conductor 21 to the meter M is responsive to variations in both the current and voltage of the reflected energy, the meter M can be calibrated as a wattmeter directly in terms of kilowatts. When the meter is thus calibrated, a meter reading can be considered as being a measure in terms of kilowatts of the magnitude of the power reflected by an impedance mismatch.

This feature of the monitor is useful in adjusting the impedance of the load to match that of the transmission line as it provides a single meter indication which is a measure of the instantaneous value of the electric power reflected by a mismatching load. When the impedance mismatch increases, the amount of reflected power also increases to produce correspondingly larger meter readings. Conversely, when the load impedance is adjusted to match the line impedance, all of the incident energy will be absorbed by the load circuit and the meter indication will be zero.

Since variations in the magnitude of the direct current in the conductor 21 are proportional to variations in the magnitude of the energy reflected back over the line to the transmitter 3, this rectified current can also be utilized for controlling the operation of the protective circuit 5 to protect the transmitter against the harmful effects that would otherwise result when the magnitude of the reflected power becomes large. The protective circuit 5 includes the armature and contact of the overload relay 6 which has its energizing winding supplied with the direct current carried by the conductor 21 as was described above. The rheostat 39 which is connected across the winding of the overload relay 6 as is shown in Fig. 2, is adjusted to control the sensitivity of the relay 6 so that it will not operate its armature until the magnitude of the current in the conductor 21 exceeds a preassigned value. When the current in the conductor 21 rises above this value, as would be the case when the reflected power exceeds a safe operating limit, then the overload relay 6 will operate its armature to open the protective circuit 5.

As is shown in Fig. 1, the protective circuit 5 extends from the armature and contact of the relay 6 to the frequency doubler stages (not shown) in the transmitter 3. This protective circuit 5 is adapted to respond to the operation of the armature of relay 6 by applying a cut-off bias to the frequency doubler stages thereby disabling or deenergizing the transmitter 3 by interrupting its radio frequency output. When there is no radio frequency output from the transmitter, there will be no reflected power and, if the trouble is cleared, normal operation will be restored after an interval of about one tenth of a second. A small signal light (not shown) can be so connected into the circuit as to become lit under these conditions to indicate that the interruption was caused by a high power reflection on the line. If desired, the protective circuit 5 can be so constructed and arranged as to energize any suitable warning device instead of deenergizing the transmitter 3.

Since the monitor measures the impedance mismatch at the point in the transmission line 2 where the monitor is located, it will be responsive not only to any impedance unbalance between the load circuit and the transmission line but also to any impedance discontinuities in the transmission line 2 itself, such as those that might be caused by dents in the concentric conductors 10 and 11. Therefore, the protective circuit 5 will also protect the transmitter 3 against such impedance discontinuities in the line itself. It will also protect the transmitter against arcs that are initiated by lightning or other causes and that are sustained by the radio frequency power derived from the transmitter.

Returning now to Fig. 3, consider the operation of the incident power circuit, the output of which is connected to the meter M by throwing the switch handle 42 to the right as was described above.

Two sample currents $i_{Id}$ and $i_{Ed}$ flow in the resistor 29 and capacitance 25, respectively, in the directions indicated by the arrows in Fig. 3. Since the relative values of the impedances in this circuit are the same as those in the reflected power measuring circuit, the values of these sample currents $i_{Id}$ and $i_{Ed}$ can be expressed in the same manner as the sample currents developed in the reflected power measuring circuit. However, the incident power measuring circuit is not responsive to energy reflected back over the line but is responsive only to direct energy traveling from the transmitter to the load. This is due to the fact that the resistor 29 is connected to the load side of its associated inductive slot 24 as was explained above. When a condition of balance has been obtained in a manner similar to that described above, the sample currents $i_{Id}$ and $i_{Ed}$ will be equal in amplitude and will add in phase. Their sum is rectified by the detector 30 to produce a flow of direct current through the galvanometer M. Since the meter scale S is calibrated directly in terms of kilowatts as was mentioned above, the current now flowing through the meter M will produce a meter indication which can be taken as a measure of the magnitude of the energy incident to the load.

By subtracting the reflected power meter indication obtained when the switch handle 42 is thrown to the left from the incident power meter indication obtained when the switch handle 42 is thrown to the right, a measure of the net power absorbed or consumed in the load can be obtained in terms of kilowatts. If desired, the two detector circuits could be connected in series and poled so that their currents would be subtractive. The meter would then indicate directly the power dissipated in the load provided there was a linear relation between the radio frequency power and the direct current response of the detectors. Although the real measure of power would be the scaler product of the line voltage and line current vectors and although the measure provided by the monitor is the sum of samples of these vector quantities, the meter, if calibrated with a matched line termination, will provide substantially accurate power readings for considerable departures from a matched load condition. The power thus measured is that power which would be dissipated in a load located at the same place as the monitor. If the load is separated from the monitor by a length of transmission line, the actual power dissipated in the load will be less than the monitor determination by an amount equal to the loss in the transmission line. However, this presents no substantial disadvantage because the attenuation in most practical transmission lines is quite small and can be readily calculated.

From the above discussion, it follows that the ratio of the incident power meter reading ($P_I$) and the reflected power meter reading ($P_R$) is a measure of the amount by which the transmission line is misterminated by the load impedance. The standing wave ratio on the coaxial line can be computed from the following expression:

$$SWR = \frac{1+\sqrt{\frac{P_R}{P_I}}}{1-\sqrt{\frac{P_R}{P_I}}}$$

When the impedance of the load has been adjusted so that the meter readings will produce a standing wave ratio which is unity, then the load impedance may be considered as being a pure resistance equal to the characteristic impedance of the transmission line.

What is claimed is:

1. In a high frequency transmission system having a transmitter adapted to deliver high frequency energy over a coaxial transmission line to a load circuit, a monitor inserted in said coaxial line and comprising a shielded enclosure surrounding a portion of the coaxial line and containing in combination two bridged-T networks connected in a back-to-back manner, each of said networks having a resistor in one series arm, a rectifier in the other series arm, and a capacitance in the shunt arm, both of the series arms in each network being bridged by an inductance, each of said inductances being constituted by a separate slot in the outer conductor of the coaxial line, and each of said capacitances being formed by a capacitor plate inserted through its associated inductive slot into proximity with the inner conductor of said coaxial line.

2. In a high frequency transmission system having a transmission for delivering high frequency energy over a coaxial transmission line to a load circuit, a monitor inserted in said coaxial line for determining the amount of power consumed in said load circuit, said monitor comprising a shielded enclosure surrounding a portion of said coaxial line and containing in combination two-bridged-T networks connected in a back-to-back manner, one of said networks being so constructed and arranged as to produce a direct current having a magnitude proportional to the magnitude of energy flowing in one direction in said coaxial line, and the other of said networks being so constructed and arranged as to produce a direct current the magnitude of which is proportional to the magnitude of energy flowing in the opposite direction in said coaxial line.

3. In a high frequency transmission system having a transmitter which delivers high frequency energy over a coaxial transmission line to a load circuit, a monitor inserted in said coaxial line for determining the amount of power absorbed by said load circuit, said monitor comprising a shielded enclosure surrounding a portion of said coaxial line and containing in combination two bridged-T networks connected in a back-to-back manner, the first of said networks being so constructed and arranged as to be responsive only to incident energy flowing in said coaxial line, said first network including a rectifier for producing a direct current which is proportional to said incident energy, the second of said networks being so constructed and arranged as to be responsive only to energy reflected back over said coaxial line, and said second network including a rectifier for producing a direct current which is proportional to said reflected energy.

4. In a high frequency transmission system having a transmitter adapted to deliver high frequency energy over a coaxial transmission line to a load circuit, a monitor inserted in said coaxial line and comprising a shielded enclosure surrounding a portion of the coaxial line and containing in combination two bridged-T networks connected in a back-to-back manner, each of said networks having a resistor in one series arm, a rectifier in the other series arm, and a capacitance in the shunt arm, both of the series arms in each network being bridged by an inductance, each of said inductances being constituted by a separate slot in the outer conductor of the coaxial line, each of said capacitances being formed by a capacitor plate inserted through its associated inductive slot into proximity with the inner conductor of said coaxial line, first directive means for rendering the first of said networks responsive only to incident energy flowing in said coaxial line from the transmitter to the load circuit, said first directive means including means for connecting the resistor in said first network to the load side of its associated inductive slot, second directive means for rendering the second of said networks responsive only to energy reflected back over said coaxial line to the transmitter, and said second directive means including means for connecting the resistor in said second network to the transmitter side of its associated inductive slot.

5. In a high frequency transmission system having a transmitter adapted to deliver high frequency energy over a coaxial transmission line to a load circuit, a monitor inserted in said coaxial line and comprising a shielded enclosure surrounding a portion of the coaxial line and containing in combination two bridged-T networks connected in a back-to-back manner, each of said networks having a resistor in one series arm, a rectifier in the other series arm, and a capacitance in the shunt arm, both of the series arms in each network being bridged by an inductance, each of said inductances being constituted by a separate slot in the outer conductor of the coaxial line, connecting means for connecting each of said resistors across its associated inductive slot, each of said capacitances being formed by a capacitor plate inserted through its associated inductive slot into proximity with the inner conductor of said coaxial line, and adjustable holding means extending from said shielded enclosure into the coaxial line through said inductive slots for holding each of said capacitor plates in variable degrees of proximity to the inner conductor of the coaxial line.

6. In a high frequency transmission system having a transmitter adapted to deliver high frequency energy over a coaxial transmission line to a load circuit, a monitor inserted in said coaxial line and comprising a shielded enclosure surrounding a portion of the coaxial line and containing a bridged-T network having a resistor in one series arm, a rectifier in the other series arm, and a capacitance in the shunt arm, both of said series arms being bridged by an inductance constituted by a slot in the outer conductor of the coaxial line, said capacitance being formed by a capacitor plate inserted through said inductive slot into proximity with the inner conductor of said coaxial line.

7. In a high frequency transmission system having a transmitter adapted to deliver high frequency energy over a coaxial transmission line to a load circuit, a monitor inserted in said coaxial line and comprising a shielded enclosure surrounding a portion of the coaxial line and containing a bridged-T network having a resistor in one series arm, a rectifier in the other series arm, and a capacitance in the shunt arm, both of said series arms being bridged by an inductance constituted by a slot in the outer conductor of the coaxial line, said capacitance being formed by a capacitor plate inserted through said inductive slot into proximity with the inner conductor of said coaxial line, adjustable holding means extending from said shielded enclosure into the coaxial line through said inductive slot for holding said capacitor plate in variable degrees of proximity to the inner conductor of said coaxial line for obtaining different values of said capacitance, and connecting means for connecting said resistor across said inductive slot by connecting one end of said resistor to said adjustable holding means and by connecting the other end of said resistor to one side of said inductive slot.

8. In a high frequency transmission system having a transmitter of high frequency energy connected by a coaxial transmission line to a load circuit, said coaxial line carrying incident energy from the transmitter to the load circuit and also carrying reflected energy reflected back to the transmitter, a monitor inserted in said coaxial line for obtaining a measure of the energy flowing in one direction in said coaxial line, said monitor comprising a shielded enclosure surrounding a portion of said coaxial line and containing a bridged-T network having a resistor in one series arm, a rectifier in the other series arm, and a capacitance in the shunt arm, both of said series arms being bridged by an inductance constituted by a slot in the outer conductor of the coaxial line, said capacitance being formed by a capacitor plate inserted into the coaxial line through said inductive slot, holding means for holding said capacitor plate in proximity to the inner conductor of said coaxial line, and directive means for rendering said network responsive only to energy flowing in one direction in said coaxial line, said directive means including connecting means for connecting one end of said resistor to said holding means and for connecting the other end of said resistor to that side of said inductive slot which is opposite to the source of the energy to be measured by said monitor.

WILLIAM H. DOHERTY.
JOHN F. MORRISON.
ELMER L. YOUNKER.

REFERENCES CITED

The following references are of record in the file of this patent:

UNITED STATES PATENTS

| Number | Name | Date |
|---|---|---|
| 2,304,015 | Peterson et al. | Dec. 1, 1942 |
| 2,338,556 | Weldon | Jan. 4, 1944 |
| 2,415,823 | Houghton | Feb. 18, 1947 |
| 2,416,977 | Brown et al. | Mar. 4, 1947 |
| 2,423,390 | Korman | July 1, 1947 |
| 2,423,416 | Sontheimer et al. | July 1, 1947 |

OTHER REFERENCES

Article "A Method of Determining and Monitoring Power and Impedance at High Frequencies" by Morrison and Younker, published in Proceedings of the Institute of Radio Engineers, vol. 36, pp. 212–216, February 1948. (Copy in Div. 10.)